(12) United States Patent
Tsai

(10) Patent No.: US 11,723,374 B2
(45) Date of Patent: Aug. 15, 2023

(54) COMPUTER NUMERICALLY CONTROLLED FLOW RESISTANCE SYSTEM BASED ON CONTAINER FEATURES AND PROPERTIES OF FOOD INGREDIENTS

(71) Applicant: FAR EAST UNIVERSITY, Tainan (TW)

(72) Inventor: Jo-Peng Tsai, Tainan (TW)

( * ) Notice: Subject to any disclaimer, the term of this patent is extended or adjusted under 35 U.S.C. 154(b) by 0 days.

(21) Appl. No.: 17/506,668

(22) Filed: Oct. 21, 2021

(65) Prior Publication Data

US 2022/0159974 A1 May 26, 2022

(30) Foreign Application Priority Data

Nov. 24, 2020 (TW) ................................. 109141055
Sep. 27, 2021 (TW) ................................. 110135787

(51) Int. Cl.
*A21C 15/00* (2006.01)
*A21C 11/16* (2006.01)
(Continued)

(52) U.S. Cl.
CPC .......... *A21C 15/002* (2013.01); *A21C 11/163* (2013.01); *A23P 20/15* (2016.08);
(Continued)

(58) Field of Classification Search
CPC ......... A21C 15/00; A21C 9/04; A21C 11/163; A21D 13/47; A23P 30/25; B29C 64/20;
(Continued)

(56) References Cited

U.S. PATENT DOCUMENTS

2013/0089642 A1\* 4/2013 Lipson .................. B29C 64/106
426/115
2015/0351416 A1\* 12/2015 Bigeard ................. A21D 13/30
426/549
(Continued)

FOREIGN PATENT DOCUMENTS

CN   208497686 U  *  2/2019
CN   110881678      3/2020
(Continued)

OTHER PUBLICATIONS

Machine English translation of Cheng et al. (TW-201424608-A), with TW-I510195-B as equivalent (Year: 2014).*
Machine English translation of Cai Si-nong (CN-208497686-U) (Year: 2019).*

*Primary Examiner* — Francisco W Tschen
*Assistant Examiner* — EdgaredManuel Troche

(57) ABSTRACT

A computer numerically controlled flow resistance system based on container features and properties of food ingredients comprises a mixing chamber, a stirring element, a pushing plate and a resetting element. The mixing chamber is communicated to sources of food ingredients of various colors, and the stirring element is disposed in the mixing chamber for stirring the food ingredients of various colors, so that the food ingredients after mixing have a desired color. The pushing plate is used to extrude the stirred food ingredients in the mixing chamber to a pastry tip of a pastry extrusion head. The resetting element makes a piston cylinder move to an extruding position according to an extrusion signal of a controller, and when the pushing plate stops displacing, the resetting element makes the piston cylinder move to a flow resistance position according to a flow resistance signal of the controller.

11 Claims, 14 Drawing Sheets

(51) Int. Cl.
*A23P 20/15* (2016.01)
*A23P 30/25* (2016.01)
*B01F 27/80* (2022.01)
*B01F 101/06* (2022.01)

(52) U.S. Cl.
CPC .............. *A23P 30/25* (2016.08); *B01F 27/80* (2022.01); *B01F 2101/06* (2022.01)

(58) Field of Classification Search
CPC ..... B29C 64/35; B29C 64/106; B29C 64/209; B29C 64/241; B29C 64/321; B29C 64/329; B29C 64/336; B29C 64/393; C04B 2111/00181
USPC ................................................ 99/450; 700/28
See application file for complete search history.

(56) References Cited

U.S. PATENT DOCUMENTS

| | | | | |
|---|---|---|---|---|
| 2018/0007949 A1* | 1/2018 | Sung | ....................... | B33Y 30/00 |
| 2018/0008079 A1* | 1/2018 | Han | ........................ | A23L 5/10 |
| 2018/0008083 A1* | 1/2018 | Han | ........................ | A47J 27/12 |
| 2018/0338519 A1* | 11/2018 | Albert | ..................... | A23P 20/25 |
| 2020/0205461 A1* | 7/2020 | Cohen | ..................... | A23P 20/20 |
| 2020/0318679 A1* | 10/2020 | Van Der Borg | ......... | A21C 3/10 |

FOREIGN PATENT DOCUMENTS

| | | | |
|---|---|---|---|
| CN | 211746868 | | 10/2020 |
| CN | 111331845 B | | 11/2020 |
| TW | 201424608 A | * | 7/2014 |

* cited by examiner

COMPUTER NUMERICALLY CONTROLLED FLOW RESISTANCE SYSTEM BASED ON CONTAINER FEATURES AND PROPERTIES OF FOOD INGREDIENTS

CROSS-REFERENCE TO RELATED APPLICATION

This application claims priorities from Taiwan Patent Application No. 109141055, filed on Nov. 24, 2020, and Taiwan Patent Application No. 110135787, filed on Sep. 27, 2021, in the Taiwan Intellectual Property Office, the content of which are hereby incorporated by reference in their entirety for all purposes.

BACKGROUND OF THE INVENTION

1. Field of Invention

The invention relates to a food processing system, and more particularly to a computer numerically controlled flow resistance system based on container features and properties of food ingredients.

2. Description of the Related Art

At present, the decoration and processing of food surfaces such as cakes and biscuits usually involves filling creamy ingredients such as cream, frosting, chocolate or jam into a pastry bag, and manually extruding the creamy ingredient out of the pastry bag through a conical nozzle to decorate the surface of the food. The food surface is decorated with various designs of patterns, shapes, and texts to increase customers' desire to buy the food. At present, when using the existing computer numerically controlled (CNC) food processor, the pastry extrusion head needs to be replaced frequently during the extrusion process. Therefore, the existing pastry extrusion head placement rack needs to be equipped with a fixing element to fix or loosen the pastry extrusion head in order to install the pastry extrusion head on the feeding cylinder or remove the pastry extrusion head from the feeding cylinder, it will take a great amount of time to replace the pastry extrusion head, and the time of fixing or loosening the pastry extrusion head by the fixing element must be accurately matched with the feeding cylinder, otherwise the pastry extrusion head will easily fall to the outside of the pastry extrusion head placement rack or will skew, causing the manufacturing process to be interrupted. Traditionally, in extrusion of a food ingredient, after the food ingredient fluid is extruded, even if the extruding action is stopped, the liquid will continue to flow out due to the residual pressure, which makes it difficult to control the flow rate required for the extrusion, and the food ingredient remains outside the extrusion nozzle (i.e. pastry extrusion head), affecting the extruding shape and causing difficulty in cleaning. However, the existing pastry extruding device cannot adjust the required temperature according to the properties of the food, which often causes the pastry nozzle to be clogged or the extrusion volume is too much and difficult to be controlled. Moreover, food ingredients are likely to remain on the pastry nozzle, resulting in defects in the extruded product, and therefore it requires labor to remove the food ingredients. Moreover, there is currently no product with a design that can automatically mix food ingredients and colors on the market, so users need to manually mix the food ingredients and colors. However, each color mixing requires a certain amount of food ingredients, and users cannot mix the food ingredients and colors at any time they want according to requirements.

SUMMARY OF THE INVENTION

In view of the above, an object of the invention is to provide a computer numerically controlled flow resistance system based on container features and properties of food ingredients to solve the above-mentioned problems of the prior art.

In order to achieve the foregoing object, the invention discloses a computer numerically controlled flow resistance system based on container features and properties of food ingredients for connecting with a pastry extrusion head, the computer numerically controlled flow resistance system based on container features and properties of food ingredients comprising: a mixing chamber communicated to a plurality of food ingredient sources, wherein the food ingredient sources input a plurality of food ingredients into the mixing chamber according to a mixing ratio, and colors of the food ingredients are the same or different; a stirring element disposed in the mixing chamber for stirring the food ingredients, so that a mixture after stirring having a color corresponding to the mixing ratio; a pushing plate disposed in the mixing chamber, the pushing plate being movably sleeved with the stirring element and performing a displacement along the stirring element in the mixing chamber, thereby extruding the mixture out of a pastry tip of the pastry extrusion head, wherein the pushing plate is connected to a piston rod of a piston cylinder to perform the displacement to extrude the mixture out of the pastry tip of the pastry extrusion head, wherein the pushing plate has a perforation, and the stirring element passes through the perforation movably and airtightly; and a resetting element disposed between the piston cylinder and the mixing chamber, wherein when the pushing plate performs the displacement, the resetting element moves the piston cylinder to an extruding position according to an extrusion signal of a controller, when the pushing plate stops performing the displacement, the resetting element moves the piston cylinder to a flow resistance position according to a flow resistance signal of the controller, thereby driving the pushing plate to move in a flow resistance direction, so that the mixture is flush with or recessed in the pastry tip of the pastry extrusion head.

Preferably, the stirring element is connected to a driving motor to rotate and stir the food ingredients.

Preferably, the food ingredient sources input the food ingredients into the mixing chamber via a side wall of the mixing chamber.

Preferably, the mixing chamber is disposed on a food processor to perform a plurality of axis movements.

Preferably, the mixing chamber is detachably connected to the pastry extrusion head by magnetic attraction.

Preferably, the mixing chamber has a first connecting element, the pastry extrusion head has a second connecting element, either the first connecting element or the second connecting element is an electromagnet, and the other of the first connecting element or the second connecting element is an iron plate.

Preferably, the mixing chamber further comprises an extension plate pivotally connected to a bottom side wall of the mixing chamber, the first connecting element is disposed on the extension plate, the second connecting element is disposed on a top side wall of the pastry extrusion head, and the first connecting element and the second connecting element have concave-convex shapes matching with each other to produce a buckling effect.

Preferably, the mixing chamber further comprises a spray head for spraying a fluid toward the pastry tip of the pastry extrusion head to remove food ingredients remaining on the pastry tip of the pastry extrusion head.

Preferably, the resetting element comprises a spring, a first magnetic member provided on a bottom side of the piston cylinder, and a second magnetic member provided on a top side of the mixing chamber, wherein the first magnetic member magnetically attracts or repels with the second magnetic member according to the extrusion signal or the flow resistance signal of the controller, so that the spring is in a compressed state and stored with a compression elastic force when the pushing plate performs the displacement, and the compression elastic force is released according to the flow resistance signal when the pushing plate stops performing the displacement, so that the piston cylinder moves to the flow resistance position at a moving rate.

Preferably, the resetting element is an electric screw provided on either the piston cylinder or the mixing chamber, and is screwed to a screw hole of the other of the piston cylinder or the mixing chamber, thereby the piston cylinder is moved to the extruding position according to the extrusion signal of the controller when the pushing plate performs the displacement, and the piston cylinder is moved to the flow resistance position at a moving rate according to the flow resistance signal when the pushing plate stops performing the displacement.

In summary, the computer numerically controlled flow resistance system based on container features and properties of food ingredients of the invention can have one or more of the following advantages: (1) The pastry extrusion head of various forms can be installed or disassembled more quickly by magnetic attraction to reduce the time required for an overall food preparation. (2) The pastry extrusion head can be easily disposed in the pastry extrusion head placement rack without the need for additionally installing fixing devices. (3) With the pivotally connected extension plate, the mixing chamber and the pastry extrusion head can be connected by magnetic attraction and snap-on at the same time. (4) Provided with the spray head capable of spraying liquid and gas for cleaning and drying the pastry extrusion head. (5) Provided with the temperature controllable device capable of adjusting to a required temperature according to properties of the food ingredients. (6) The food ingredients of various colors can be stirred and mixed into a desired color. (7) Provided with the resetting element capable of preventing excessive mixture from extruding out of the pastry tip.

In order to enable the examiner to have a further understanding and recognition of the technical features of the invention and the technical efficacies that can be achieved, preferred embodiments in conjunction with detailed explanation are provided as follows.

DETAILED DESCRIPTION OF THE INVENTION

Figure 1:
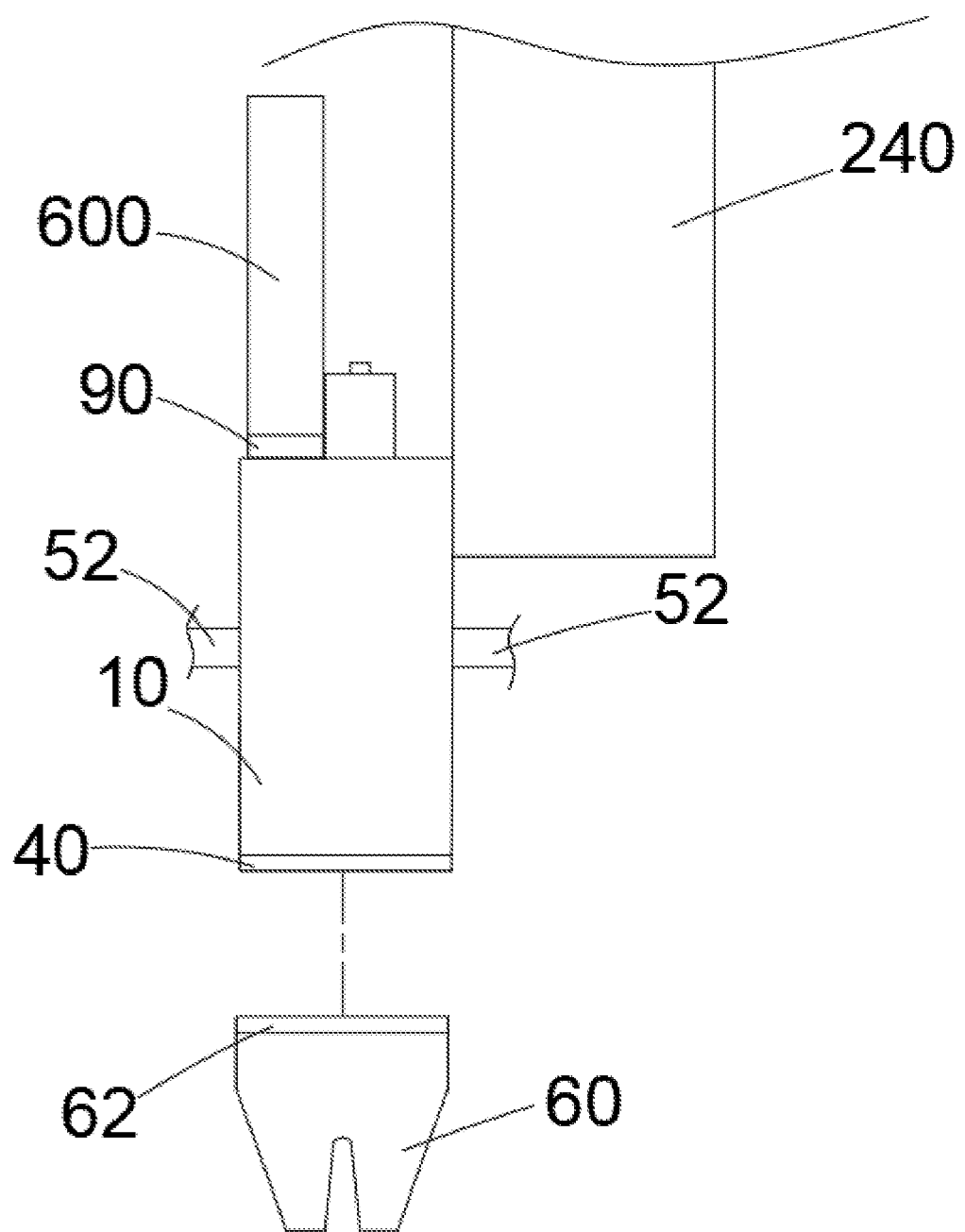
FIG. 1 is a side exploded view of a computer numerically controlled flow resistance system connected to a pastry extrusion head of a first embodiment of the invention.
Figure 2:
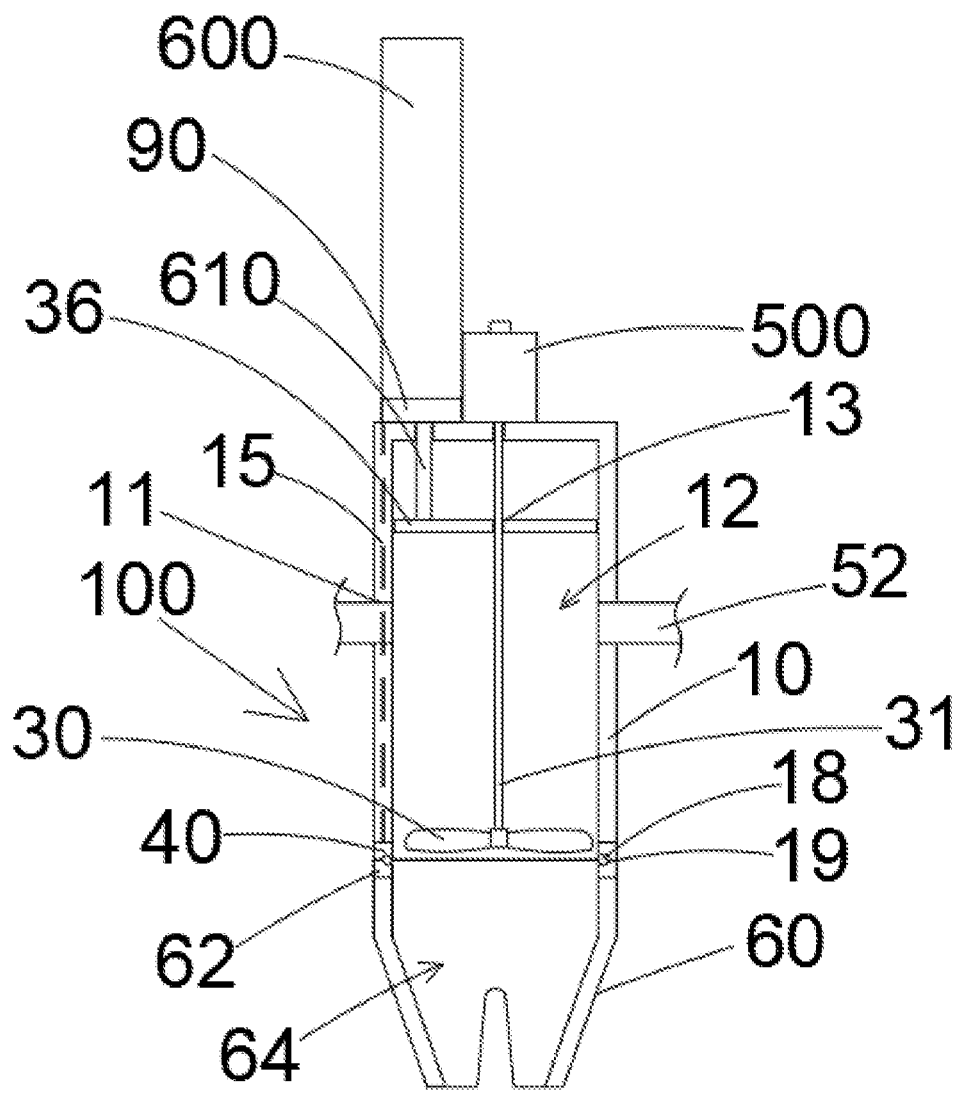
FIG. 2 is a cross-sectional side combinational view of the computer numerically controlled flow resistance system connected to the pastry extrusion head of the first embodiment of the invention.
Figure 3:
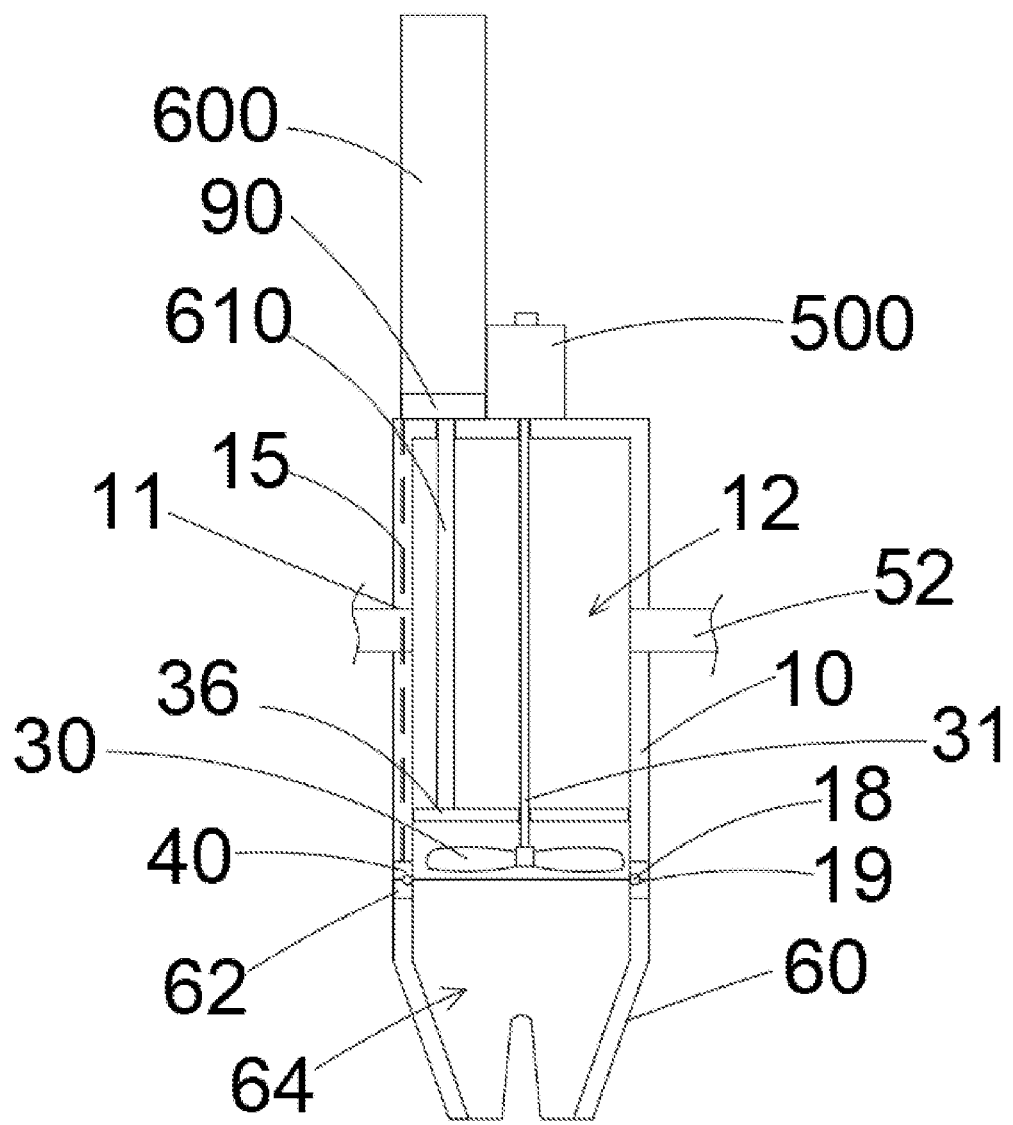
FIG. 3 is a cross-sectional side combinational view of the computer numerically controlled flow resistance system connected to the pastry extrusion head of the first embodiment of the invention, wherein a pushing plate moves toward the pastry extrusion head.
Figure 4:
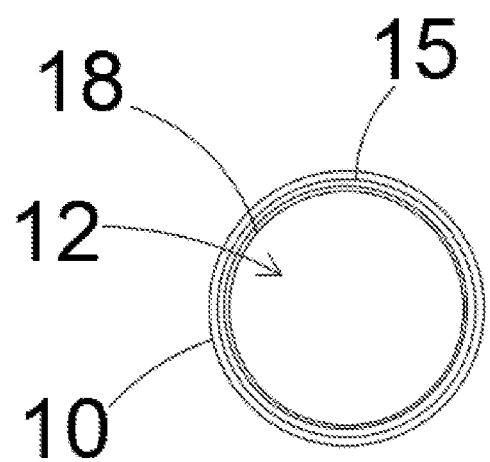
FIG. 4 is a top view of the computer numerically controlled flow resistance system of the first embodiment of the invention.
Figure 5:
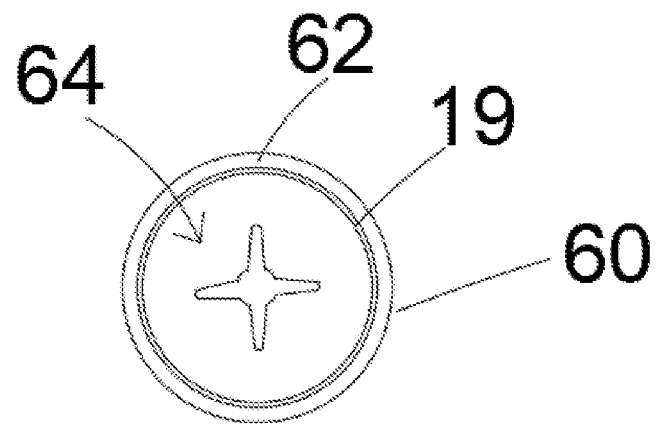
FIG. 5 is a top view of the pastry extrusion head of the first embodiment of the invention.

In order to understand the technical features, content and advantages of the invention and its achievable efficacies, the invention is described below in detail in conjunction with the figures, and in the form of embodiments, the figures used herein are only for a purpose of schematically supplementing the specification, and may not be true proportions and precise configurations after implementation of the invention; and therefore, relationship between the proportions and configurations of the attached figures should not be interpreted to limit the scope of the claims of the invention in actual implementation. In addition, in order to facilitate understanding, the same elements in the following embodiments are indicated by the same referenced numbers. And the size and proportions of the components shown in the drawings are for the purpose of explaining the components and their structures only and are not intending to be limiting.

Unless otherwise noted, all terms used in the whole descriptions and claims shall have their common meaning in the related field in the descriptions disclosed herein and in other special descriptions. Some terms used to describe in the present invention will be defined below or in other parts of the descriptions as an extra guidance for those skilled in the art to understand the descriptions of the present invention.

The terms such as "first", "second", "third", "fourth" used in the descriptions are not indicating an order or sequence, and are not intending to limit the scope of the present invention. They are used only for differentiation of components or operations described by the same terms.

Moreover, the terms "comprising", "including", "having", and "with" used in the descriptions are all open terms and have the meaning of "comprising but not limited to".

Please refer to FIGS. 1 to 5 and FIG. 10. In a first embodiment, a computer numerically controlled flow resistance system 100 of the invention is applicable for installing on a food processor 200 for detachably connecting with a pastry extrusion head 60, wherein the pastry extrusion head 60 is disposed in a pastry extrusion head placement rack 210, for example. The food processor 200 is, for example, a CNC food processor capable of performing a plurality of axis operations. The computer numerically controlled flow resistance system 100 of the invention comprises a mixing chamber 10, a stirring element 30, a pushing plate 36, and a resetting element 90. The mixing chamber 10 is, for example, a cylindrical structure with a chamber 12, and an interior of the cylindrical structure is preferably hollow, wherein the chamber 12 of the mixing chamber 10 penetrates a bottom side of the mixing chamber 10 to form an opening. A side wall of the mixing chamber 10 has a plurality of perforations 11, the perforations 11 communicate with a supply pipe 52, wherein a plurality of food ingredient sources (not shown in the figures), for example, input a plurality of food ingredients into the mixing chamber 10 at a predetermined mixing ratio via the supply pipe 52 according to a control command of the controller 400, wherein colors of the food ingredients can be the same or different. The mixing ratio can be determined according to requirements of a user. Taking the food ingredients of three colors as an example, the mixing ratio can be, for example, an equal ratio, that is, the ratio is 1:1:1. In addition, the food ingredients can be, for example, food materials and/or toners. The controller 400 can be a computer, for example. Since a person having ordinary skill in the art to which the invention pertains should be able to understand how the controller 400 controls operations of the food processor 200 and how to make the food ingredient sources supply the required food ingredients based on the disclosure content of the invention, so they will not be mentioned here again.

One of the characteristics of the invention is that the controller 400 is capable of adjusting and controlling a degree of flow resistance according to container features and properties of the food ingredients. Wherein, before the end of extrusion, the invention applies corresponding pumpback distance, pumpback speed and pause time in advance to perform flow resistance control based on a shape and a size of a pastry tip of an extrusion nozzle (the pastry extrusion head 60), a taper of the extrusion nozzle of container features, as well as the properties of the food ingredients such as viscosity, density, etc. Before the next extruding action starts, pre-extruding is performed according to the parameters of the previous flow resistance. Thereby, the invention is capable of solving the problems in the traditional technology that the fluid continues to flow out due to residual pressure, making it difficult to control the flow rate required for extrusion and the food ingredients remain outside the pastry tip, and affecting an extruding shape and causing difficulty in cleaning.

Take a 5 mm round extrusion nozzle and orange jam as an example, the preferred parameters are as follows: when a feeding speed is 2000 mm/min, an extrusion speed is 10 mm/min, and an opening of a pastry tip is 5 mm from an extrusion plane, macro NC codes are applied during pumpback, a pumpback distance is 3 mm, and a pumpback speed is 100%; in a subsequent pre-extrusion, macro NC codes of other parameters are also applied, pre-extrusion in advance is 1 second, a movement speed is controlled at 100% feeding speed, and an extrusion speed is 80%. Wherein, if the extrusion speed is not fast enough, the extruded food ingredient will be intermittent, and if the extrusion speed is too fast, an amount of the food ingredient extruded from the pastry tip of the pastry extrusion head 60 will be excessive. Take a 5 mm round extrusion nozzle and salad dressing as an example, the preferred parameters are as follows: when a feeding speed is 3400 mm/min, an extrusion speed is 20 mm/min, and an opening of a pastry tip is 4 mm from an extrusion plane, macro NC codes are applied during pumpback, a pumpback distance is 1 mm, and a pumpback speed is 100%; in a subsequent pre-extrusion, macro NC codes of other parameters are also applied, pre-extrusion in advance is 0 second, a movement speed is controlled at 100% feeding speed, and an extrusion speed is 80%. By the same token, if the extrusion speed is not fast enough, the extruded food ingredient will be intermittent, and if the extrusion speed is too fast, an amount of the food ingredient extruded from the pastry tip of the pastry extrusion head 60 will be excessive.

The stirring element 30 of the computer numerically controlled flow resistance system 100 of the invention is rotatably disposed in the mixing chamber 10, and is connected to a driving motor 500 via a rod 31 to stir the food ingredients, so that a mixture after stirring has a color corresponding to the mixing ratio.

The pushing plate 36 of the computer numerically controlled flow resistance system 100 of the invention is connected to a piston rod 610 of a piston cylinder 600, and is displaceably disposed in the mixing chamber 10 by extending or retracting the piston rod 610 by the piston cylinder 600. A center of the pushing plate 36 has a perforation 13, through the perforation 13 the pushing plate 36 is movably and airtightly sleeved with the stirring element 30, and is displaced along the stirring element 30 in the mixing chamber 10, thereby the stirred mixture is extruded out of a pastry tip 66 of the pastry extrusion head 60. Wherein, a shape of the pushing plate 36 matches a cross-sectional shape of the mixing chamber 10. For example, if the mixing chamber 10 is cylindrical, the pushing plate 36 is circular, so that a periphery of the pushing plate 36 can be abutted to an inner wall of the mixing chamber 10 closely. Wherein, in order to obtain a better abutting effect, for example, a rubber ring can be provided on the periphery of the pushing plate 36, and when the pushing plate 36 is displacing, the rubber ring is tightly attached to the inner wall of the mixing chamber 10. In addition, a hole wall of the perforation 13 of the pushing plate 36 can also be provided with a rubber ring, and when the pushing plate 36 is displacing along the stirring element 30, the pushing plate 36 can be tightly attached to the stirring element 30 with the rubber ring.

In detail, a top of the mixing chamber 10 has two perforations, a hole wall of the perforation is also preferably provided with a rubber ring, wherein one end of the rod 31 is connected to the stirring element 30, and another end of the rod 31 penetrates from an interior of the mixing chamber 10 through one of the perforations to the outside and is connected to the driving motor 500 located outside the mixing chamber 10. The piston cylinder 600 is located outside the mixing chamber 10, and the piston rod 610 of the piston cylinder 600 penetrates from the outside of the mixing chamber 10 to the interior of the mixing chamber 10 through the other perforation and is connected to the pushing plate 36. The driving motor 500 and the piston cylinder 600 perform rotational stirring or retractable displacement according to a control command of the controller 400 of the food processor 200, for example. Since a person having ordinary skill in the art to which the invention pertains should be able to understand how the controller 400 controls the driving motor 500 and the piston cylinder 600 to stir and extrude the food ingredients based on the disclosure content of the invention, so it will not be mentioned here again.

In the invention, the mixture in the mixing chamber 10 is extruded from the pastry tip 66 of the pastry extrusion head 60 by moving the pushing plate 36. After extrusion is completed, even though the pushing plate 36 has stopped displacing, the mixture in the mixing chamber 10 will continue to move toward the pastry extrusion head 60 due to inertia, which can cause an excessive and unexpected amount of the mixture to be extruded from the pastry tip 66. In order to solve this problem, the computer numerically controlled flow resistance system 100 of the invention is provided with the resetting element 90 capable of causing the pushing plate 36 to move in a flow resistance direction D (opposite to a displacement direction during extrusion) when the extrusion is completed to prevent the excessive mixture from extruding from the pastry tip 66, thereby capable of improving the extrusion quality and maintaining the extrusion cost and efficiency.

The resetting element 90 is disposed between the piston cylinder 600 and the mixing chamber 10, wherein when the pushing plate 36 is displacing, the resetting element 90 moves the piston cylinder 600 to an extruding position according to an extrusion signal of the controller 400; when the pushing plate 36 stops displacing, the resetting element 90 moves the piston cylinder 600 to a flow resistance position according to a flow resistance signal of the controller 400, thereby driving the pushing plate 36 to move in the flow resistance direction D (opposite to a displacement direction during extrusion), so that the mixture can be flush with or recessed in the pastry tip 66 of the pastry extrusion head 60.

Figure 11:
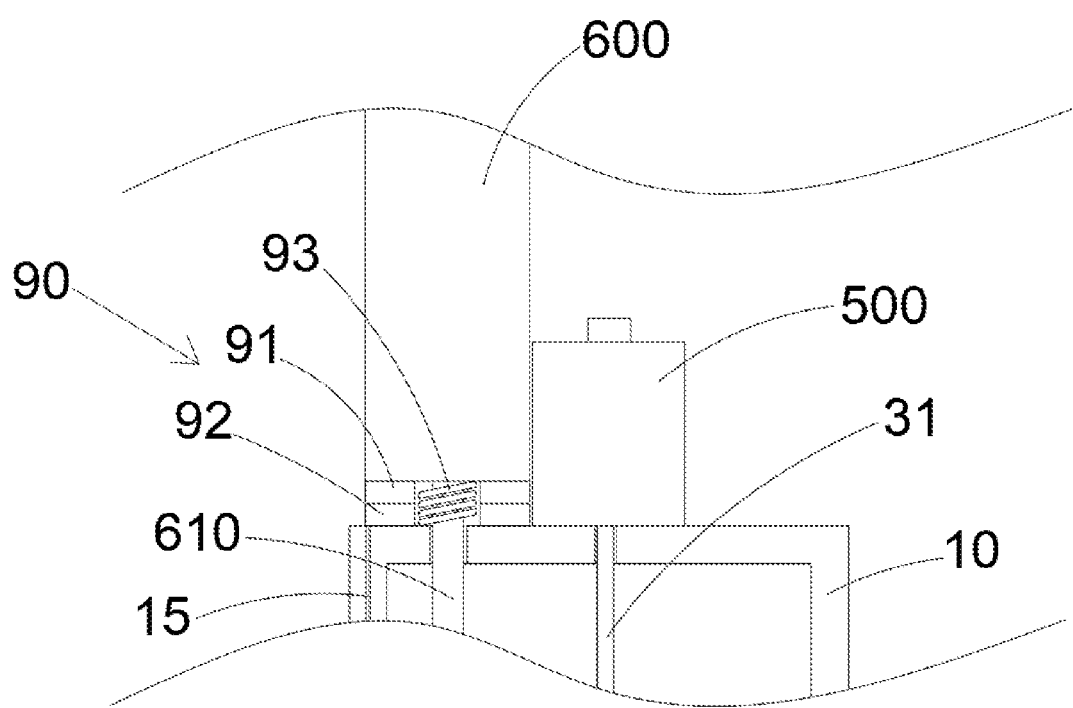
FIG. 11 is a partial cross-sectional view of a first aspect of a resetting element in the invention, wherein a piston cylinder is located at an extruding position.
Figure 12:
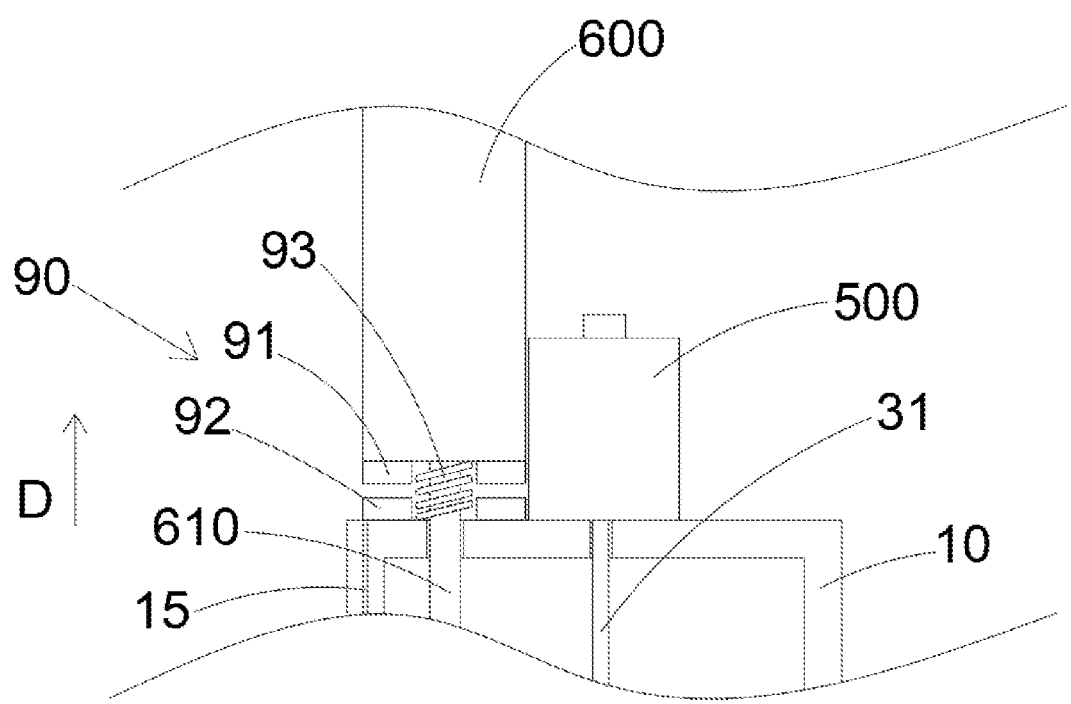
FIG. 12 is a partial cross-sectional view of the first aspect of the resetting element in the invention, wherein the piston cylinder is located at a flow resistance position.

Please refer to FIGS. 11 and 12 for a first aspect of the resetting element 90 in the invention. The resetting element 90 comprises a spring 93, a first magnetic member 91 provided on a bottom side of the piston cylinder 600, and a second magnetic member 92 provided on a top side of the mixing chamber 10. The first magnetic member 91 magnetically attracts or repels with the second magnetic member 92 according to the extrusion signal or the flow resistance signal of the controller 400, so that the spring 93 is in a compressed state and stored with a compression elastic force (FIG. 11) when the pushing plate 36 is displacing, and the compression elastic force is released according to the flow resistance signal when the pushing plate 36 stops displacing, so that the piston cylinder 600 moves to a flow resistance position in the flow resistance direction D and at a moving rate (FIG. 12). Wherein, the spring 93 can be, for example, an adjustable spring, so as to adjust a distance and/or a speed of the piston cylinder 600 moving in the flow resistance direction D by adjusting the compression elastic force of the spring 93. The spring 93 can be, for example, a torsion spring or a compression spring, but is not limited thereto.

Figure 13:
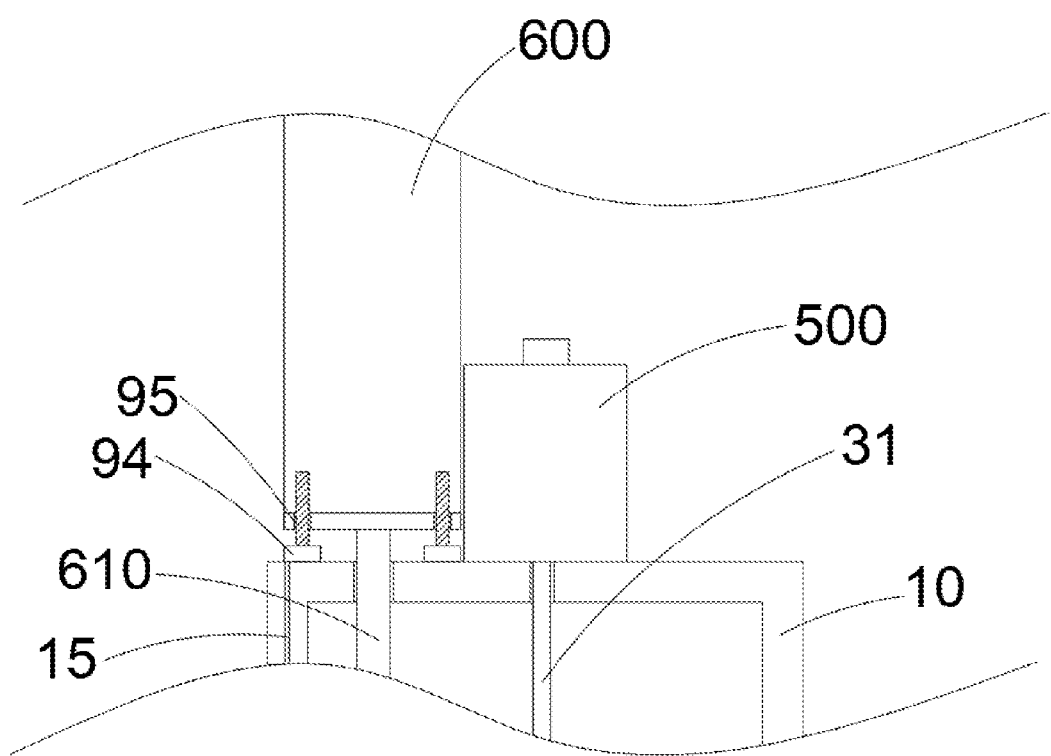
FIG. 13 is a partial cross-sectional view of a second aspect of the resetting element in the invention, wherein the piston cylinder is located at an extruding position.
Figure 14:
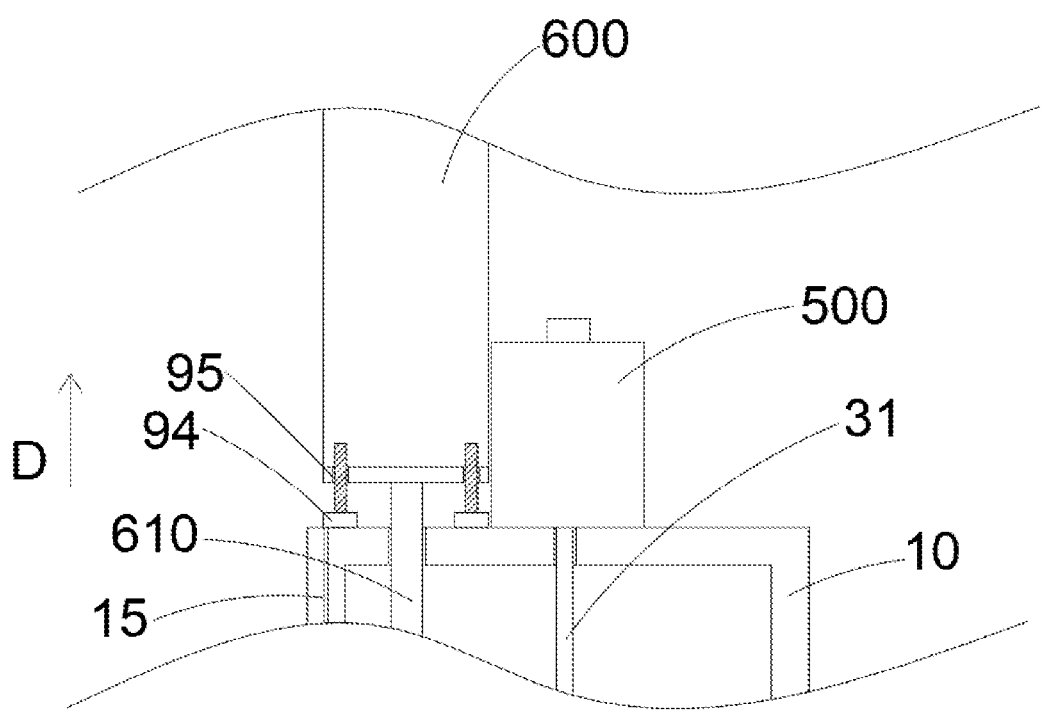
FIG. 14 is a partial cross-sectional view of the second aspect of the resetting element in the invention, wherein the piston cylinder is located at a flow resistance position.

Please refer to FIGS. 13 and 14 for a second aspect of the resetting element 90 in the invention. The resetting element 90 is an electric screw 94 provided on either the piston cylinder 600 or the mixing chamber 10, and is screwed to a screw hole 95 of the other of the piston cylinder 600 or the mixing chamber 10, thereby the piston cylinder 600 is moved to an extruding position (FIG. 13) according to the extrusion signal of the controller 400 when the pushing plate 36 is displacing; and the piston cylinder 600 is moved to a flow resistance position in the flow resistance direction D and at a moving rate according to the flow resistance signal (FIG. 14) when the pushing plate 36 stops displacing. In detail, when the controller 400 sends out the extrusion signal, the electric screw 94 rotates toward the screw hole 95 of the piston cylinder 600 according to the extrusion signal, so that a distance between the mixing chamber 10 and the piston cylinder 600 is reduced (or even a distance between the mixing chamber 10 and the piston cylinder 600 is reduced close to 0). At this time, the piston cylinder 600 is at an extruding position, and the pushing plate 36 can be pushed to displace by the piston rod 610 to extrude the mixture out from the pastry tip 66 of the pastry extrusion head 60. After extrusion is completed, the electric screw 94 rotates according to the flow resistance signal sent by the controller 400, so that the piston cylinder 600 moves in the flow resistance direction D and a distance from the mixing chamber 10 increases. At this time, the piston cylinder 600 drives the piston rod 610 to move in the flow resistance direction D along with the piston cylinder 600, so that the mixture in the mixing chamber 10 can be prevented from moving toward the pastry extrusion head 60 due to inertia. In addition, a thread connection position between the electric screw 94 and the screw hole 95 can also be adjusted through the controller 400 to adjust a distance and/or a speed of the piston cylinder 600 moving in the flow resistance direction D.

Figure 10:
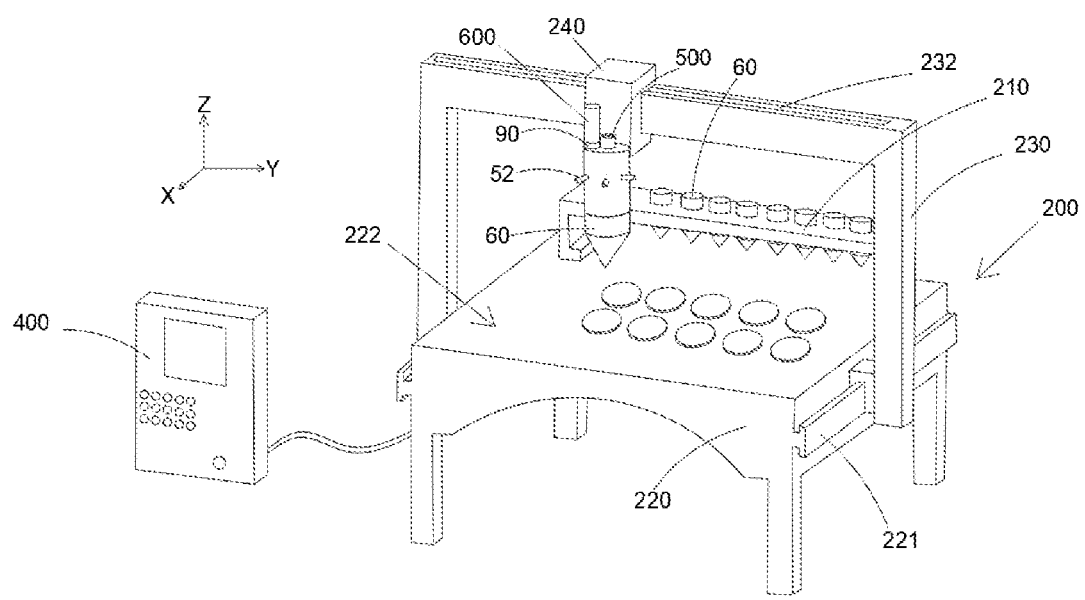
FIG. 10 is a perspective view of the computer numerically controlled flow resistance system of the first embodiment of the invention installed on a CNC food processor.

As shown in FIG. 10, the food processor 200 comprises a base 220, a first movable frame 230, a second movable frame 240, and the controller 400, wherein the computer numerically controlled flow resistance system 100 is disposed on the second movable frame 240 for detachably connecting with the pastry extrusion head 60 for decoration processing. Wherein, the base 220 comprises two lateral sliding rails 221 and a bearing surface 222. The controller 400 is used to control actions of the first movable frame 230 and the second movable frame 240. Furthermore, a shape of the first movable frame 230 can be, for example, an inverted U-shape, and two ends of the first movable frame 230 are disposed on the lateral sliding rails 221 of the base 220, so that the first movable frame 230 is capable of moving back and forth along the x-axis direction. Wherein, the first movable frame 230 can further comprise an upper sliding rail 232, and the second movable frame 240 can be disposed on the upper sliding rail 232 of the first movable frame 230, so that the second movable frame 240 is capable of moving back and forth along the y-axis direction. In addition, the first movable frame 230 can further comprise rollers to facilitate reciprocating movement on the two lateral sliding rails 221 along the x-axis direction, and the second movable frame 240 can also comprise rollers to facilitate reciprocating movement on the upper sliding rail 232 along the y-axis direction. Furthermore, the pastry extrusion head 60 can be, for example, a forward decoration processing pastry extrusion head and/or a lateral decoration processing pastry extrusion head. The pastry extrusion head 60 can be used to contain, for example, viscous, semi-liquid or semi-fluid food ingredients, such as cream, frosting, chocolate, jam or dough, etc., and the mixing chamber 10 is connected with the second movable frame 240 by screw threads, mortise and tenon or magnetic attraction, so that the pastry extrusion head 60 is capable of reciprocating along the z-axis direction. Wherein, the structure of the food processor 200 is only an example, and is not intended to limit the invention. Since the type and structure of the food processor 200 are not the key points of the invention, any food processor capable of carrying out the food extrusion process can be used as the food processor 200 and should fall within the scope of protection claimed by the invention, so it will not be mentioned here.

In detail, in the computer numerically controlled flow resistance system 100 of the invention, a first connecting element 40 is disposed on the bottom side of the mixing chamber 10, and a second connecting element 62 is disposed on a top side of the pastry extrusion head 60. Thereby, the mixing chamber 10 is detachably connected to the second connecting element 62 of the pastry extrusion head 60 through the first connecting element 40, and an opening position of the mixing chamber 10 corresponds to a guide groove 64 of the pastry extrusion head 60. Wherein, the first connecting element 40, for example, can be connected to the second connecting element 62 of the pastry extrusion head 60 by magnetic connection. Either the first connecting element 40 or the second connecting element 62 is an electromagnet or an iron plate, the other of the first connecting element 40 or the second connecting element 62 is an iron plate or a magnet, or both the first connecting element 40 and the second connecting element 62 are electromagnets capable of generating opposite magnetisms. If the computer numerically controlled flow resistance system 100 of the invention is applied to an automated food extrusion system, the computer numerically controlled flow resistance system 100, for example, can be installed on a robotic arm, and preferably a multi-axis robotic arm, such as the second movable frame 240 of the CNC food processor 200 in order to meet the requirements of various angles of food extrusion. Since the invention is detachably connected to the mixing chamber 10 and the pastry extrusion head 60 by means of electromagnet magnetic attraction, the invention is capable of accurately and quickly connecting the pastry extrusion head 60 to the mixing chamber 10 without installing additional fixing devices in order to greatly reduce the time required to replace the pastry extrusion head 60. Furthermore, the invention only needs to demagnetize the electromagnet to cause the pastry extrusion head 60 to drop into the pastry extrusion head placement rack 210, so the pastry extrusion head 60 can be quickly disassembled. In addition, the bottom side of the mixing chamber 10, for example, can be provided with a sealing gasket 18 made of material of silicon rubber, and the pastry extrusion head 60 has a sealing groove 19, and the sealing groove 19 corresponds to the sealing gasket 18. In this way, the mixing chamber 10 can be closely connected to the pastry extrusion head 60 to prevent leakage of the food ingredients.

For example, in an implementation aspect of the first embodiment, the first connecting element 40 is, for example, an electromagnet, and the second connecting element 62 of the pastry extrusion head 60 is, for example, an iron material, such as an iron plate. The mixing chamber 10 can be disposed with a conductive circuit 15, a first end of the conductive circuit 15 of the mixing chamber 10 is electrically connected to the first connecting element 40, and a second end of the conductive circuit 15 of the mixing chamber 10 is electrically connected to an electric power supply source. Wherein, in order to make the figures concise, the electric power supply source is not drawn in the figures. When the first connecting element 40 of the computer numerically controlled flow resistance system 100 of the invention generates magnetism, the second connecting element 62 of the pastry extrusion head 60 to be used can be magnetically attracted. If the pastry extrusion head 60 is to be replaced, electric power can be turned off first, with the first connecting element 40 being demagnetized, the pastry extrusion head 60 to be dismounted can be separated from the first connecting element 40. Then, the food processor 200 moves the computer numerically controlled flow resistance system 100 to a position above the pastry extrusion head 60 to be used, and then electric power is supplied again, so that the first connecting element 40 generates magnetism to attract the pastry extrusion head 60 to be used.

In another implementation aspect of the first embodiment, the first connecting element 40 is, for example, an electromagnet, and the second connecting element 62 of the pastry extrusion head 60 is, for example, an electromagnet. When the mixing chamber 10 is connected to the pastry extrusion head 60, the second connecting element 62 of the pastry extrusion head 60 can be electrically connected to the second end of the conductive circuit 15 of the mixing chamber 10, so as to supply electric power through the electric power supply source to the first connecting element 40 on the mixing chamber 10 to generate magnetism. In other words, when the first connecting element 40 of the computer numerically controlled flow resistance system 100 of the invention contacts the pastry extrusion head 60, both the first connecting element 40 and the second connecting element 62 are capable of generating magnetism with opposite magnetic poles, for example, S pole and N pole respectively to attract the second connecting element 62 of the pastry extrusion head 60 to be used by magnetic force. If the pastry extrusion head 60 is to be replaced, electric power supply can be turned off first, and the first connecting element 40 and the second connecting element 62 can be demagnetized so that the pastry extrusion head 60 to be dismounted can be separated from the first connecting element 40, and then the food processor 200 moves a position of the computer numerically controlled flow resistance system 100 and electric power is supplied again, and the first connecting element 40 and the second connecting element 62 generate magnetism to attract the other pastry extrusion head 60 to be used.

Figure 6:
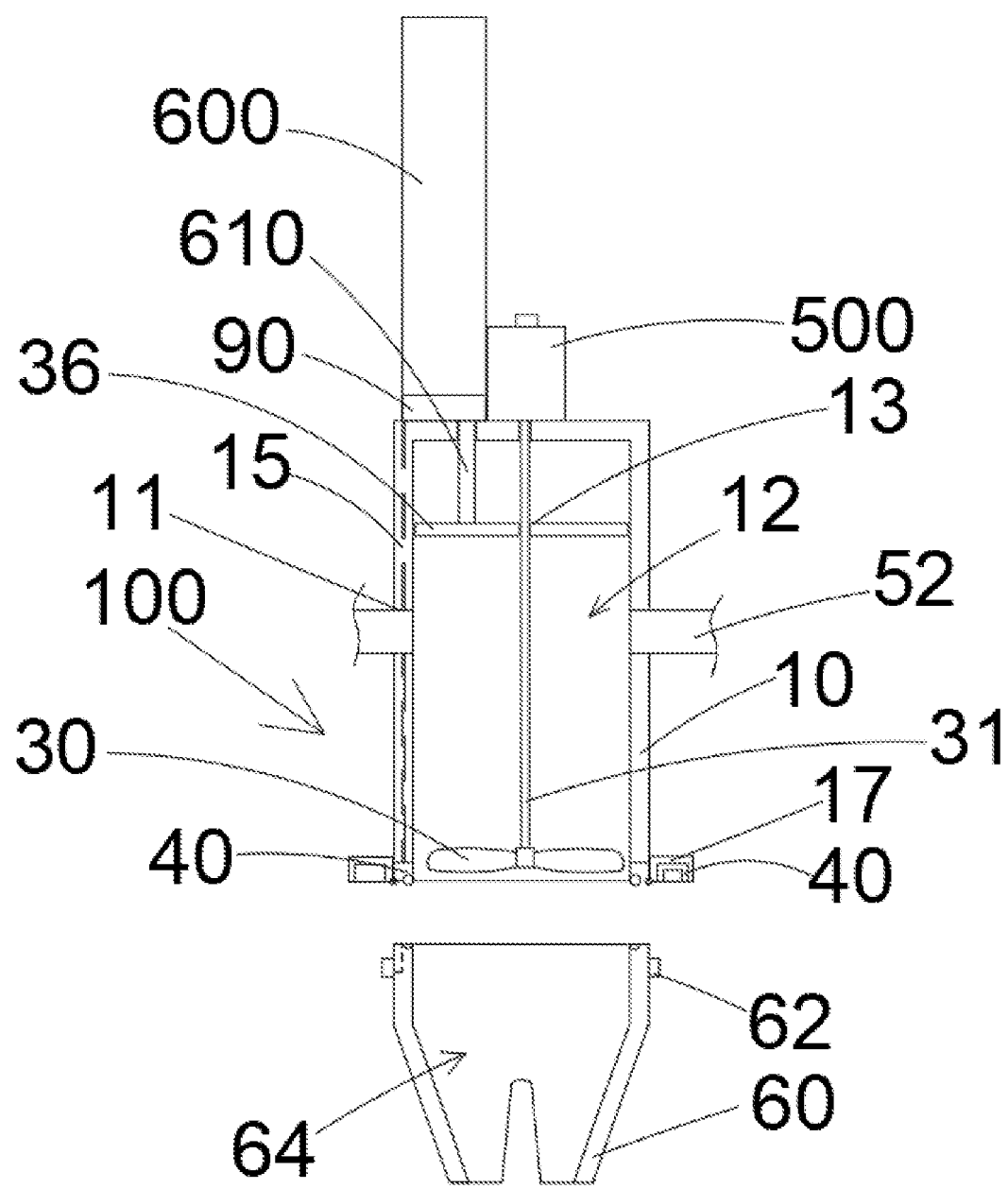
FIG. 6 is a cross-sectional side exploded view of the computer numerically controlled flow resistance system connected to the pastry extrusion head of a second embodiment of the invention.
Figure 7:
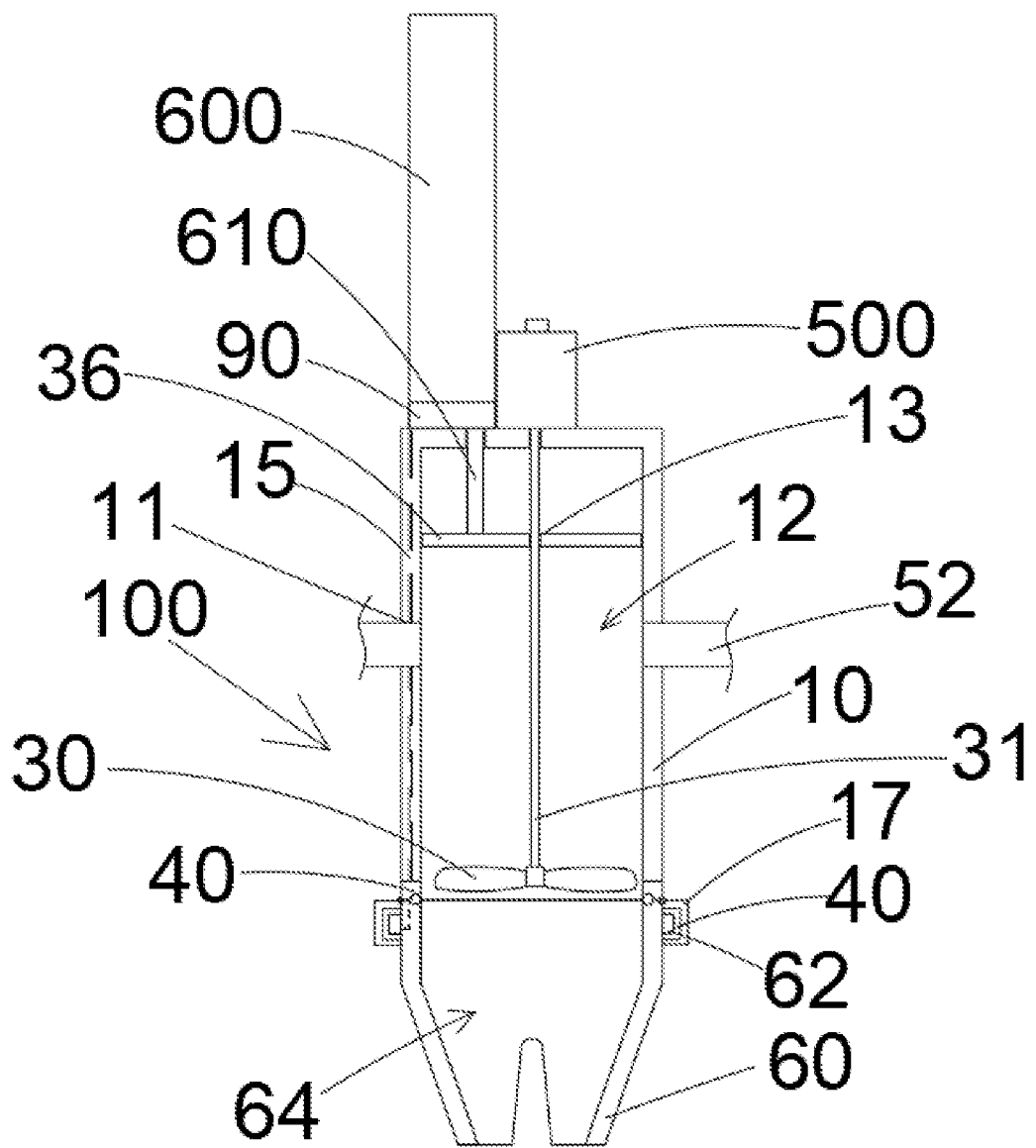
FIG. 7 is a cross-sectional side combinational view of the computer numerically controlled flow resistance system connected to the pastry extrusion head of the second embodiment of the invention.

In addition, please refer to FIGS. 6 and 7. In a second embodiment of the invention, the mixing chamber 10 comprises an extension plate 17 pivotally connected to a bottom side wall of the mixing chamber 10, and the extension plate 17 is pivotally connected to the bottom side wall of the mixing chamber 10 by penetrating a spin axis of a torsion spring. The extension plate 17 is, for example, substantially perpendicular to the side wall of the mixing chamber 10 in a non-pivoting state by a restoring force of the torsion spring, so as to prevent the extension plate 17 from obstructing the mixing chamber 10 to connect to the pastry extrusion head 60. Wherein, in addition to the first connecting element 40 being disposed on the bottom side of the mixing chamber 10, the first connecting element 40 can also be additionally disposed on the extension plate 17 or can be modified to be disposed on the extension plate 17; in addition to the second connecting element 62 being disposed on a top side of the pastry extrusion head 60, the second connecting element 62 can also be correspondingly additionally disposed on a top side wall of the pastry extrusion head 60 or can be modified to be disposed on the top side wall of the pastry extrusion head 60, so that when the first connecting element 40 and the second connecting element 62 are attracted to each other by magnetic force, the extension plate 17 can be pivoted to cause the first connecting element 40 on the extension plate 17 to be magnetically attracted on the second connecting element 62 on the top side wall of the pastry extrusion head 60. In other words, in addition to a longitudinal magnetic attraction between the connecting mixing chamber 10 and the pastry extrusion head 60, a lateral magnetic attraction can be added or modified, so that the mixing chamber 10 can be more firmly connected to the pastry extrusion head 60 to avoid falling off accidentally. In addition, a shape of the first connecting element 40 on the extension plate 17 and the second connecting element 62 on the top side wall of the pastry extrusion head 60 can be flat or can be a concave-convex shape, and preferably in concave-convex shapes matching with each other. When the first connecting element 40 on the extension plate 17 is magnetically attracted on the second connecting element 62 on the top side wall of the pastry extrusion head 60, a buckling effect can be produced to effectively avoid falling off. In a similar way, the invention is not limited to the above examples, the extension plate 17 can also be modified to be pivoted on a top end of the pastry extrusion head 60, and the first connecting element 40 can be modified to be disposed on the bottom side wall of the mixing chamber 10.

Figure 8:
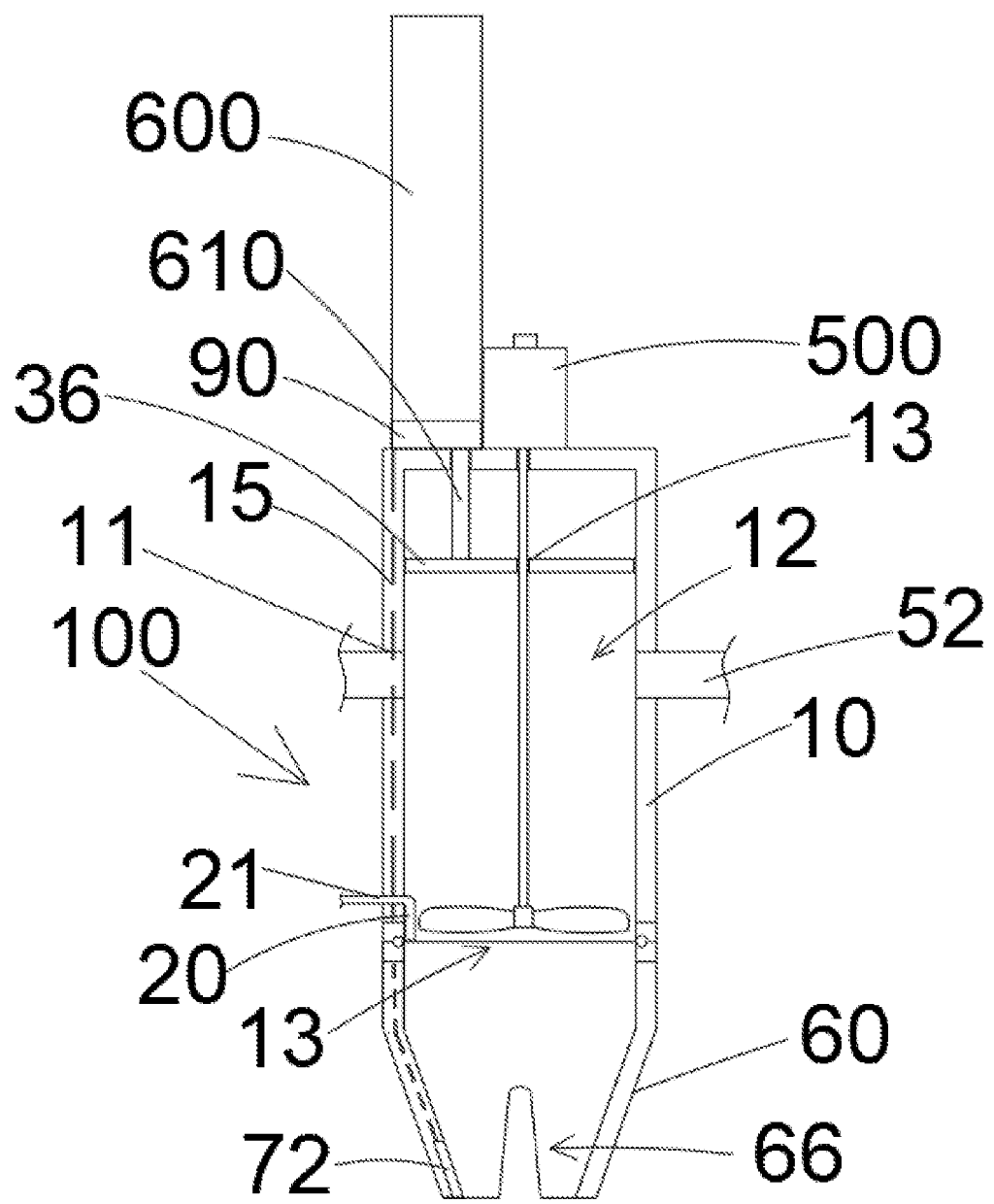
FIG. 8 is a cross-sectional side combinational view of the computer numerically controlled flow resistance system connected to the pastry extrusion head of a third embodiment of the invention.

Furthermore, please refer to FIG. 8, in an implementation aspect of a third embodiment of the invention, in addition to the structure described in the first embodiment and/or the second embodiment, the computer numerically controlled flow resistance system 100 of the invention further comprises a material removal element, for example, a spray head 20 disposed on an inner surface of the mixing chamber 10 to perform a material removal process, wherein the spray head 20 preferably has a plurality of nozzles disposed around the inner surface of the mixing chamber 10, and an opening direction of the nozzle is preferably facing toward the pastry tip 66 of the pastry extrusion head 60, so that a cleaning fluid such as gas or liquid can be sprayed toward the opening of the mixing chamber 10. In addition, in another implementation aspect of the third embodiment of the invention, preferably, the spray head 20 can also have a plurality of nozzles disposed around and on an outer surface of the mixing chamber 10, and the opening direction of the nozzle is preferably facing toward the pastry tip 66, so as to spray gas or liquid toward the pastry tip 66. In addition, if the nozzles of the spray head 20 are located on the inner surface of the mixing chamber 10, the opening direction of the nozzle of the spray head 20 is, for example, parallel to a tangential direction of the inner surface of the mixing chamber 10 and disposed on the inner surface of the mixing chamber 10 at an included angle facing downward, by generating a fluid vortex that rotates downward along the inner surface of the mixing chamber 10, the food ingredients remaining on the pastry tip 66 of the pastry extrusion head 60 can be effectively removed. Wherein, the downwardly-facing included angle is approximately between 0 degrees and 90 degrees, and preferably 45 degrees.

Wherein, the nozzles of the spray head 20 can be communicated with each other through a fluid pipeline 21, and communicated to a fluid supply source (not shown in the figures) through the fluid pipeline 21, wherein the fluid supply source is electrically connected to the controller 400, thereby providing a high-pressure gas according to a cleaning command of the controller 400, a pressure value is approximately greater than 10 kg per square centimeter, so that the high-pressure gas is ejected from the nozzles of the spray head 20 to remove residual materials remaining on an inner surface and/or an outer surface of the pastry tip 66 of the pastry extrusion head 60. Wherein, a time span for the nozzles of the spray head 20 to spray a liquid can be, for example, approximately between 1 and 10 seconds. Preferably, the fluid supply source of the invention can also, for example, supply a high-pressure liquid to the spray head 20 through the fluid pipeline 21, so as to spray the high-pressure liquid from the nozzles of the spray head 20 to remove residual food ingredients remaining on the inner surface and/or the outer surface of the pastry tip 66 of the pastry extrusion head 60, and then a high-pressure gas can be supplied to the spray head 20 through the fluid pipeline 21, and the high-pressure gas is ejected to dry a liquid remaining on the pastry tip 66 of the pastry extrusion head 60 for subsequent processes. For example, in the invention, the above-mentioned material removal process can be performed after the pastry extrusion head 60 is magnetically attracted, and then an extrusion process can be performed. Alternatively, in the invention, after the extrusion process is completed, the above-mentioned material removal process can be performed first, and then a disposition process of the pastry extrusion head 60 can be performed. Wherein, a time span for the nozzles of the spray head 20 to spray a gas can be, for example, approximately between 1 and 10 seconds. In addition, the nozzles of the spray head 20 of the invention can spray high-pressure liquid and gas alternately, for example, first spray a high-pressure liquid for a time span of approximately between 1-10 seconds, and then spray a high-pressure gas for a time span of approximately between 1-10 seconds, and then a high-pressure liquid is sprayed for a time span of approximately between 1-10 seconds, and so on, which is capable of effectively removing food ingredients remaining on the pastry tip 66 of the pastry extrusion head 60.

For example, the computer numerically controlled flow resistance system 100 of the invention can further have, for example, a detection element 72 disposed on the pastry tip 66 of the pastry extrusion head 60, and the detection element 72 is electrically connected to the controller 400, for example, through the aforementioned method. In the material removal process, after the nozzles of the spray head 20 spray liquid and gas to remove food ingredients remaining on the pastry tip 66 of the pastry extrusion head 60, the detection element 72 can detect whether there is food ingredient remaining on the pastry tip 66 of the pastry extrusion head 60, if there is food ingredient, the detection element 72 can generate a detection result signal to the controller 400, wherein the controller 400 is capable of generating a cleaning command based on the detection result signal, after the fluid supply source receives the cleaning command, the fluid supply source can supply a fluid to the spray head 20, so that the spray head 20 can perform the material removal process again. Wherein, the detection element 72 is not limited to an optical sensor, an electronic sensor, or an image sensor, etc., as long as it can be used to determine whether there is food ingredient remaining on the pastry tip 66 of the pastry extrusion head 60, it can be applied to the invention. For the optical sensor, the detection element 72, for example, can be disposed on the pastry tip 66 of the pastry extrusion head 60, by determining whether light is interrupted by food ingredients, whether the material removal process of the pastry tip 66 of the pastry extrusion head 60 is successful can be determined; if removal is not successful, the material removal process can be performed again.

Figure 9:
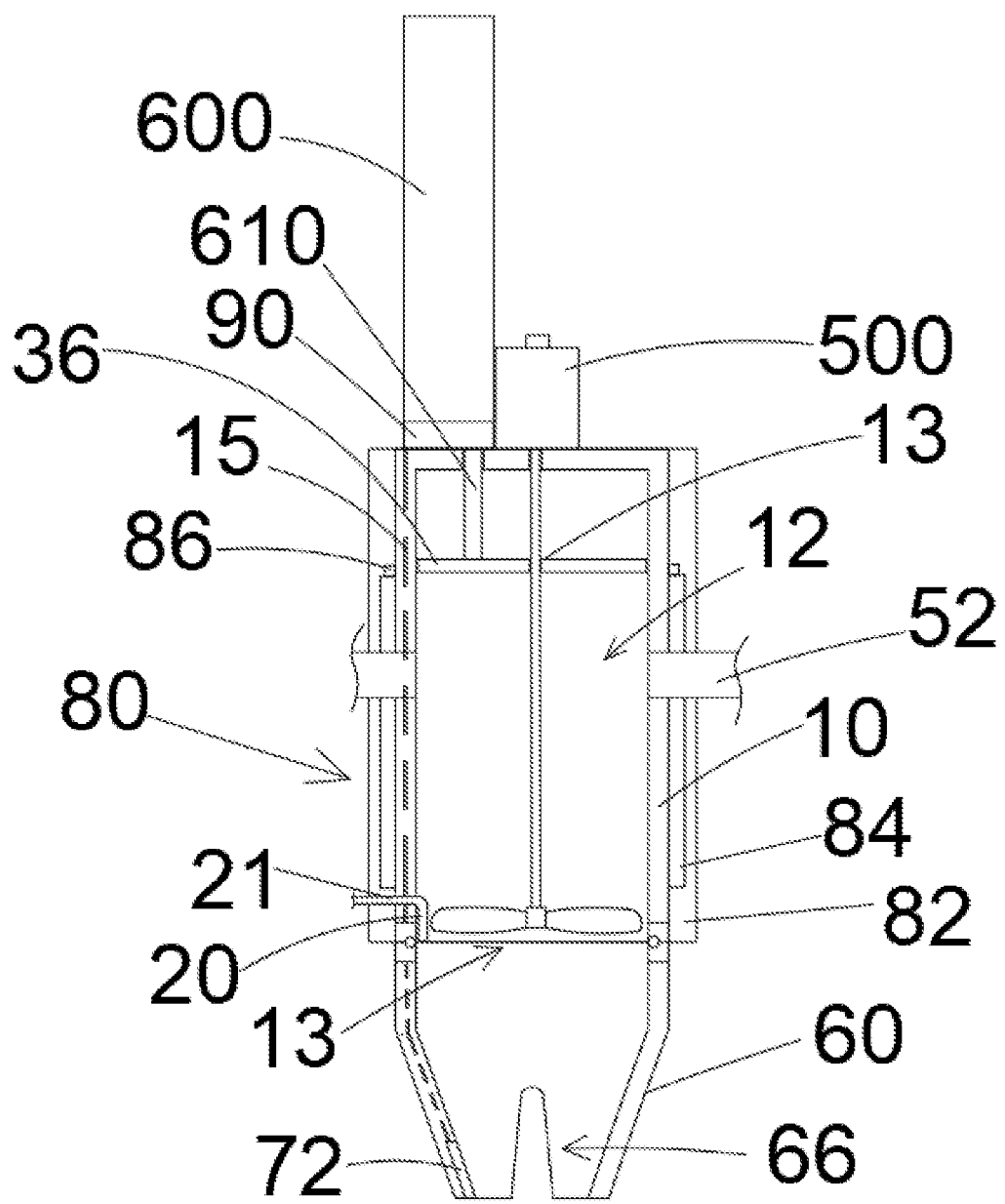
FIG. 9 is a cross-sectional side combinational view of the computer numerically controlled flow resistance system connected to the pastry extrusion head of a fourth embodiment of the invention.

Please refer to FIG. 9, in a fourth embodiment of the invention, in addition to the structures exemplified in the first, second, and/or third embodiments, in an implementation aspect, the computer numerically controlled flow resistance system 100 of the invention, for example, can further have a temperature controllable device 80 disposed on the mixing chamber 10, and in order to be applicable to food ingredients with various temperature properties, such as chocolate, cream or syrup, etc., the temperature controllable device 80 at least has a temperature regulating element 84, and the temperature regulating element 84 is composed of a heater capable of raising temperature and/or a cooler capable of lowering temperature. The temperature regulating element 84 is disposed on the mixing chamber 10, and is preferably disposed around an inner side or an outer side of the mixing chamber 10. In an actual extrusion process, the controller 400 preferably generates a corresponding temperature controllable command according to temperature properties of a food ingredient. The temperature controllable device 80 of the invention is preferably capable of receiving a temperature controllable command from the controller 400 to control a temperature of the mixing chamber 10 to be between 0° C. and 60° C. to match the temperature properties of the food ingredient.

In addition, in order to obtain a better temperature control effect, the temperature controllable element 80 of the invention can further comprise, for example, a thermal insulation jacket 82, wherein the thermal insulation jacket 82 has a double-layer fabric structure with a chamber, and inside the chamber is filled with a thermal insulation material. The thermal insulation jacket 82 is used to detachably annularly cover the side wall of the mixing chamber 10, and preferably further annularly cover the side wall of the pastry extrusion head 60. Wherein, an outer shape of the thermal insulation jacket 82 can be, for example, a plate shape, and two ends of the thermal insulation jacket 82 have corresponding fasteners, such as buttons, for fastening or buckling with each other.

In addition, the temperature controllable device 80 of the invention, for example, further comprises a temperature sensor 86 disposed on the mixing chamber 10 to detect a temperature of a food ingredient in the mixing chamber 10 and transmit a temperature sensing signal to the controller 400, thereby the controller 400 generating a corresponding temperature controllable command to cause the temperature regulating element 84 adjust a temperature according to the temperature controllable command of the controller 400. If a temperature of a food ingredient reaches a set temperature, the temperature regulating element 84 stops operating; if the temperature is lower or higher than the set temperature, the heater or the cooler of the temperature regulating element 84 performs corresponding operations to adjust the temperature.

In addition, besides the temperature controllable device 80 of the invention being disposed on the mixing chamber 10, the invention can further have the temperature controllable devices 80 disposed on the pastry extrusion head 60, for example, thereby the temperature controllable devices 80 are not limited to only capable of controlling the mixing chamber 10 and the pastry extrusion head 60 at a same temperature, that is, the temperature controllable devices 80 are also capable of controlling the mixing chamber 10 and the pastry extrusion head 60 at different temperatures according to the temperature controllable command of the controller 400 to meet temperature properties of a food ingredient. For example, the melting point of chocolate is 29 degrees Celsius, but the storage temperature is 12 to 18 degrees Celsius. Therefore, if the computer numerically controlled flow resistance system 100 of the invention is applied to extrusion of chocolate, for example, a temperature of the mixing chamber 10 is controlled to be between 18 degrees Celsius and 29 degrees Celsius, and a temperature of the pastry extrusion head 60 is controlled to be above 29 degrees Celsius.

In summary, the computer numerically controlled flow resistance system based on container features and properties of food ingredients of the invention can have one or more of the following advantages: (1) The pastry extrusion head of various forms can be installed or disassembled more quickly by magnetic attraction to reduce the time required for an overall food preparation. (2) The pastry extrusion head can be easily disposed in the pastry extrusion head placement rack without the need for additionally installing fixing devices. (3) With the pivotally connected extension plate, the mixing chamber and the pastry extrusion head can be connected by magnetic attraction and snap-on at the same time. (4) Provided with the spray head capable of spraying liquid and gas for cleaning and drying the pastry extrusion head. (5) Provided with the temperature controllable device capable of adjusting to a required temperature according to properties of the food ingredients. (6) The food ingredients of various colors can be stirred and mixed into a desired color. (7) Provided with the resetting element capable of preventing excessive mixture from extruding out of the pastry tip.

Note that the specification relating to the above embodiments should be construed as exemplary rather than as limitative of the present invention, with many variations and modifications being readily attainable by a person of average skill in the art without departing from the spirit or scope thereof as defined by the appended claims and their legal equivalents.

What is claimed is:

1. A computer numerically controlled flow resistance system based on container features and properties of food ingredients that detachably connects with a pastry extrusion head, the computer numerically controlled flow resistance system adjusts and controls a degree of flow resistance based on container features and properties of food ingredients, and comprising:

a mixing chamber communicated to a plurality of food ingredient sources, wherein the food ingredient sources input a plurality of food ingredients via a plurality of supply pipes into the mixing chamber according to a mixing ratio, and colors of the food ingredients are different, the mixing chamber further comprises a spray head that sprays a fluid toward a pastry tip of the pastry extrusion head to remove food ingredients remaining on the pastry tip of the pastry extrusion head, and the spray head has a plurality of nozzles disposed around an inner surface of the mixing chamber, an opening direction of each of the nozzles is facing toward the pastry tip of the pastry extrusion head that performs a material removal process that sprays the fluid toward the pastry tip of the pastry extrusion head, wherein the opening direction of each of the nozzles of the spray head is parallel to a tangential direction of the inner surface of the mixing chamber and disposed on the inner surface of the mixing chamber at an included angle facing downward, so that the fluid sprayed toward the pastry tip of the pastry extrusion head forms a fluid vortex that rotates downward along the inner surface of the mixing chamber;

a stirring element disposed in the mixing chamber that stirs the food ingredients of various colors with the mixing ratio, so that a mixture after stirring having a color corresponding to the mixing ratio;

a pushing plate disposed in the mixing chamber, the pushing plate being movably sleeved with the stirring element and performing a displacement along the stirring element in the mixing chamber, thereby extruding the mixture out of the pastry tip of the pastry extrusion head, wherein the pushing plate is connected to a piston rod of a piston cylinder to perform the displacement to extrude the mixture out of the pastry tip of the pastry extrusion head, wherein the pushing plate has a perforation, and the stirring element passes through the perforation movably and airtightly;

a resetting element disposed between the piston cylinder and the mixing chamber, wherein when the pushing plate performs the displacement in a displacement direction, the resetting element moves the piston cylinder to an extruding position according to an extrusion signal of a controller, when the pushing plate stops performing the displacement, the resetting element moves the piston cylinder to a flow resistance position in a flow resistance direction, which is opposite to the displacement direction, according to a flow resistance signal of the controller, thereby driving the pushing plate to move in the flow resistance direction, so that the mixture is flush with or recessed in the pastry tip of the pastry extrusion head, wherein the controller adjusts and controls the degree of flow resistance according to container features, which comprise a shape and a size of the pastry tip and a taper of the pastry extrusion head, and properties of the food ingredients, which comprise a viscosity and a density of the food ingredients; and a detection element disposed on the pastry tip of the pastry extrusion head, the detection element detects whether there are the food ingredients remaining on the pastry tip of the pastry extrusion head, if there are the food ingredients, the detection element generates a detection result signal to the controller, wherein the controller generates a cleaning command based on the detection result signal, after a fluid supply source receives the cleaning command, the fluid supply source supplies the fluid to the spray head such that the spray head performs the material removal process again.

2. The computer numerically controlled flow resistance system based on container features and properties of food ingredients as claimed in claim 1, wherein the stirring element is connected to a driving motor to rotate and stir the food ingredients.

3. The computer numerically controlled flow resistance system based on container features and properties of food ingredients as claimed in claim 1, wherein the food ingredient sources input the food ingredients into the mixing chamber via a side wall of the mixing chamber.

4. The computer numerically controlled flow resistance system based on container features and properties of food ingredients as claimed in claim 1, wherein the mixing chamber is disposed on a food processor to perform a plurality of axis movements.

5. The computer numerically controlled flow resistance system based on container features and properties of food ingredients as claimed in claim 1, wherein the mixing chamber is detachably connected to the pastry extrusion head by magnetic attraction.

6. The computer numerically controlled flow resistance system based on container features and properties of food ingredients as claimed in claim 1, wherein the mixing chamber has a first connecting element, the pastry extrusion head has a second connecting element, either the first connecting element or the second connecting element is an electromagnet, and the other of the first connecting element or the second connecting element is an iron plate.

7. The computer numerically controlled flow resistance system based on container features and properties of food ingredients as claimed in claim 6, wherein the mixing chamber further comprises an extension plate pivotally connected to a bottom side wall of the mixing chamber, the first connecting element is disposed on the extension plate, the second connecting element is disposed on a top side wall of the pastry extrusion head, and the first connecting element and the second connecting element have concave-convex shapes matching with each other to produce a buckling effect.

8. The computer numerically controlled flow resistance system based on container features and properties of food ingredients as claimed in claim 1, wherein the resetting element comprises a spring, a first magnetic member provided on a bottom side of the piston cylinder, and a second magnetic member provided on a top side of the mixing chamber, wherein the first magnetic member magnetically attracts or repels with the second magnetic member according to the extrusion signal or the flow resistance signal of the controller, so that the spring is in a compressed state and stored with a compression elastic force when the pushing plate performs the displacement, and the compression elastic force is released according to the flow resistance signal when the pushing plate stops performing the displacement, so that the piston cylinder moves to the flow resistance position at a moving rate.

9. The computer numerically controlled flow resistance system based on container features and properties of food ingredients as claimed in claim 1, wherein the detection element is an optical sensor, an electronic sensor, or an image sensor.

10. The computer numerically controlled flow resistance system based on container features and properties of food ingredients as claimed in claim 1, wherein the mixing chamber and the pastry extrusion head are controlled by a temperature controllable device at a same temperature.

11. The computer numerically controlled flow resistance system based on container features and properties of food ingredients as claimed in claim 1, wherein the mixing chamber and the pastry extrusion head are controlled by a temperature controllable device at different temperatures.

* * * * *